United States Patent
Pettey

(10) Patent No.: US 7,859,151 B2
(45) Date of Patent: Dec. 28, 2010

(54) HOBBY SERVO SHAFT ATTACHMENT MECHANISM

(75) Inventor: Brian Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 217 days.

(21) Appl. No.: 12/187,690

(22) Filed: Aug. 7, 2008

(65) Prior Publication Data
US 2009/0066198 A1    Mar. 12, 2009

Related U.S. Application Data

(60) Provisional application No. 60/964,120, filed on Aug. 9, 2007.

(51) Int. Cl.
*H02K 7/10* (2006.01)
(52) U.S. Cl. .................................... 310/75 R; 310/75 D
(58) Field of Classification Search ............... 310/75 R, 310/75 D, 80
See application file for complete search history.

(56) References Cited

U.S. PATENT DOCUMENTS

| | | | |
|---|---|---|---|
| 2,364,599 A * | 12/1944 | Burrus ........................ 464/182 |
| 2,703,847 A * | 3/1955 | Kalikow ....................... 290/46 |
| 3,735,164 A | 5/1973 | Linn et al. .................... 310/41 |
| 4,081,705 A | 3/1978 | Johnson ....................... 310/90 |
| 4,429,204 A | 1/1984 | McGuire et al. ............ 219/751 |
| 5,492,024 A | 2/1996 | Siner .......................... 74/89.22 |
| 5,533,712 A * | 7/1996 | Fujikawa et al. ............ 254/362 |
| 7,270,589 B1 | 9/2007 | Brown et al. ................ 446/317 |

* cited by examiner

*Primary Examiner*—Dang D Le
(74) *Attorney, Agent, or Firm*—Westman, Champlin & Kelly, P.A.

(57) ABSTRACT

Embodiments of an apparatus for providing enhanced hobby servo motor operational capacity are disclosed. Embodiments include a hobby servo motor having a rotatable output shaft. The rotatable output shaft is splined in that it includes a plurality of circumferentially distributed splines. Embodiments also include a shaft attachment mechanism having a spline receiving portion that includes a plurality of circumferentially distributed protrusions sized and dispersed to support functional engagement of the shaft attachment mechanism to the rotatable shaft. The functional engagement is such that rotation of the rotatable shaft causes a corresponding rotation of the shaft attachment mechanism. The shaft attachment mechanism further includes an elongated shaft that is positioned inline with the rotatable output shaft when the shaft attachment is functionally engaged to the rotatable output shaft.

16 Claims, 8 Drawing Sheets

HOBBY SERVO SHAFT ATTACHMENT MECHANISM

REFERENCE TO RELATED CASE

The present application claims priority of U.S. provisional patent application Ser. No. 60/964,120, filed Aug. 9, 2007, the content of which is hereby incorporated by reference in its entirety.

BACKGROUND

The present invention generally pertains to the hobby-mechanical industry. More specifically, the present invention pertains to a hobby servo shaft attachment mechanism.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

Some applications require that shafts (i.e., axles, rods, beams, etc.) be driven (e.g., rotated) by a hobby servo. Driving any shaft with the output shaft of a hobby servo presents challenges at least because the output shaft is typically not very durable.

SUMMARY

Embodiments of an apparatus for providing enhanced hobby servo motor operational capacity are disclosed. Embodiments include a hobby servo motor having a rotatable output shaft. The rotatable output shaft is splined in that it includes a plurality of circumferentially distributed splines. Embodiments also include a shaft attachment mechanism having a spline receiving portion that includes a plurality of circumferentially distributed protrusions sized and dispersed to support functional engagement of the shaft attachment mechanism to the rotatable shaft. The functional engagement is such that rotation of the rotatable shaft causes a corresponding rotation of the shaft attachment mechanism. The shaft attachment mechanism further includes an elongated shaft that is positioned inline with the rotatable output shaft when the shaft attachment is functionally engaged to the rotatable output shaft.

DETAILED DESCRIPTION

Figure 1:
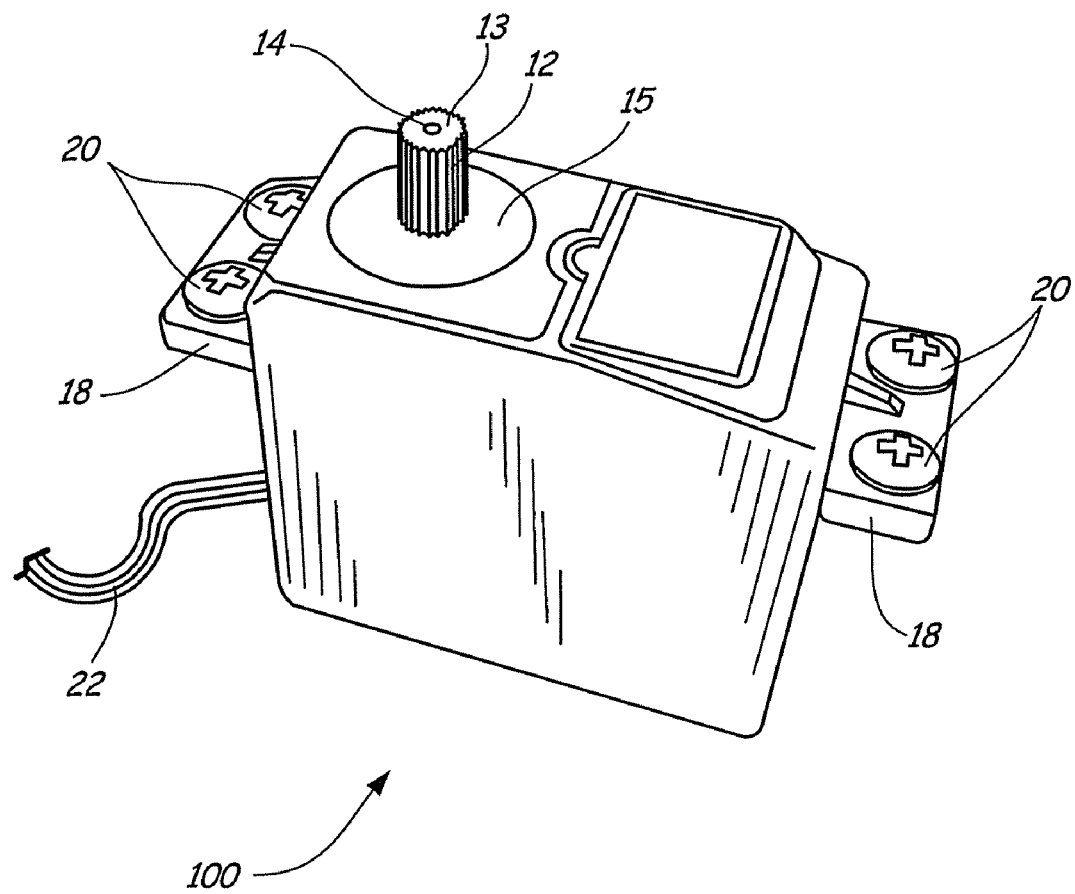
FIG. 1 is a perspective view of an exemplary hobby servo.

Certain embodiments described herein are intended for implementation in association with a motor such as, but not limited to, a hobby servo motor, or more simply stated, a hobby servo. FIG. 1 is a perspective view of one example of a suitable hobby servo 100. Hobby servo 100 can be any type of hobby servo and is not limited in terms of its style, capacity, motor speed, or load carrying capability. Hobby servo 100 is not intended to suggest any limitation as to the scope of use or functionality of the claimed subject matter. Neither should hobby servo 100 be interpreted as having any dependency or requirement relating to any one or combination of illustrated components.

Hobby servo 100 includes a rotatable splined output shaft 12, rotable splined shaft output top 13, threaded orifice 14, circular planar surface 15, a pair of flanges 18, mounting screws 20, and an electrical cable 22. Splined output shaft 12 has teeth (or ridges) distributed around the outside surface of the output shaft. This configuration is described as a "male" spline configuration. Standard configurations of hobby servos have 23, 24, or 25 teeth. Threaded orifice 14 extends into splined output shaft 12 and is adapted to receive an attachment screw (not shown). Flanges 18 are adapted to receive mounting screws 20. Flanges 18 and screws 20 are adapted to work in combination to mount hobby servo 100 in an operating environment. Electrical cable 22 is attached to the hobby servo 100 and provides electrical power and/or electrical signals to cause the output shaft 12 to rotate in a counter-clockwise or clockwise direction.

Figure 2:
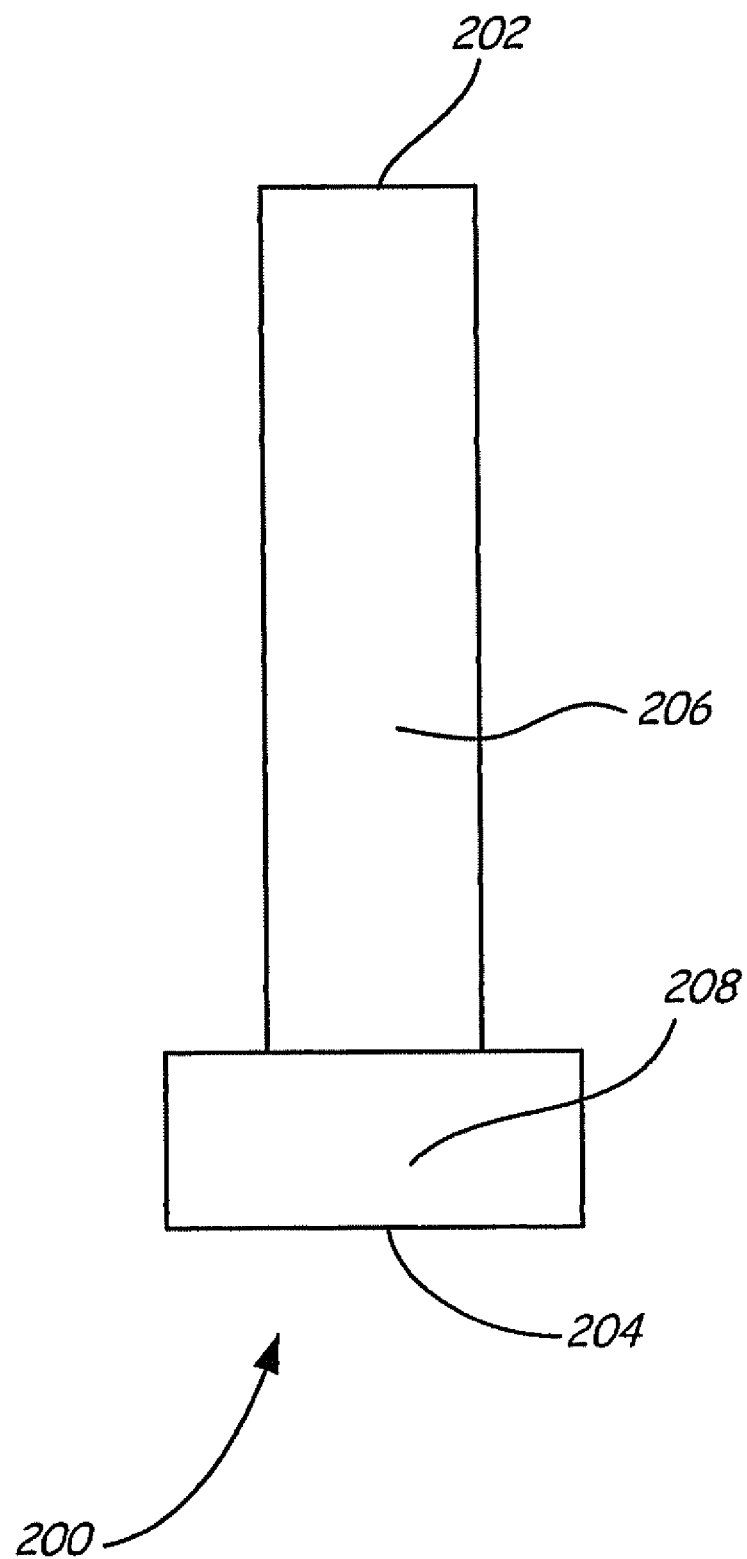
FIG. 2 is a side view of a hobby servo shaft attachment mechanism.

FIG. 2 is a side view of an embodiment of a hobby servo shaft attachment mechanism 200 (hereinafter "HSAM 200"). HSAM 200 includes a top surface 202, a bottom surface 204, an attachment surface 206, and an output shaft attachment housing 208. In an embodiment, attachment surface 206 provides a cylindrical surface that receives attachment items that include a bore. The diameter of the cylindrical surface of HSAM 200 is manufactured to any desired value. For example, the bore is made to accommodate ¼" or ⅜" bored attachment items. Attachment surface 206 need not be a cylindrical area. Embodiments of attachment surface 206 include every shape and size.

Figure 3:
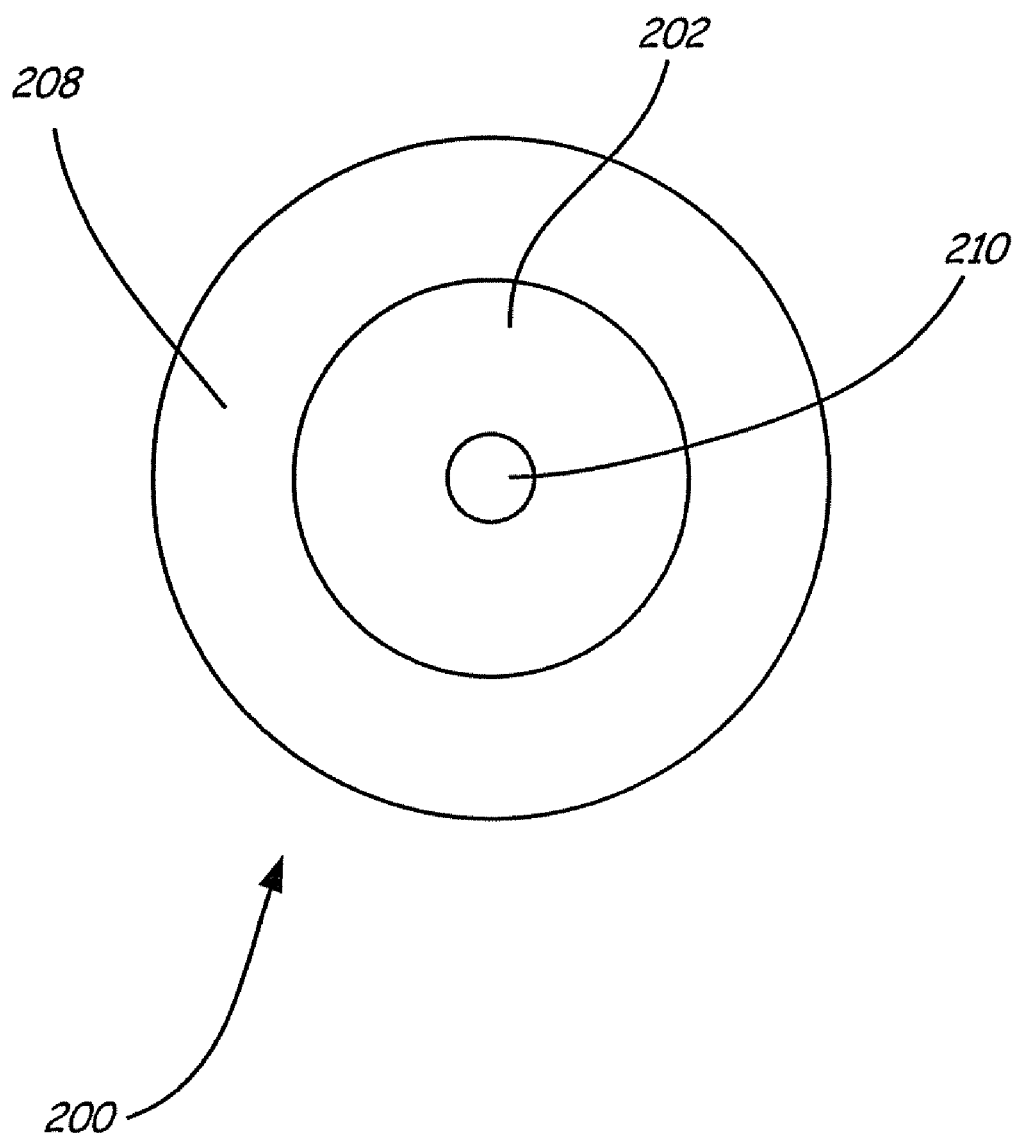
FIG. 3 is a top view of a hobby servo shaft attachment mechanism.

FIG. 3 is a top view of an embodiment of HSAM 200. HSAM 200 includes top surface 202, output shaft attachment housing 208, and attachment mechanism orifice 210 (hereinafter "AMO 210"). In an embodiment, AMO 210 provides an opening that extends from top surface 202 to bottom surface 204 (shown in FIG. 2). In an embodiment, AMO 210 receives an attachment mechanism such that HSAM 200 is secured to hobby servo 100. In one embodiment, AMO 210 receives a screw that has a head with a larger diameter than AMO 210 such that the head of the screw rests on top surface 202. In that embodiment, the screw extends through AMO 210 and threads into the standard engagement inside servo output shaft orifice 14. It is worth noting that in certain embodiments, HSAM 200 and output shaft 12 are in-line with each other, meaning that HSAM 200 and output shaft 12 share a common axis that they rotate around.

Figure 4:
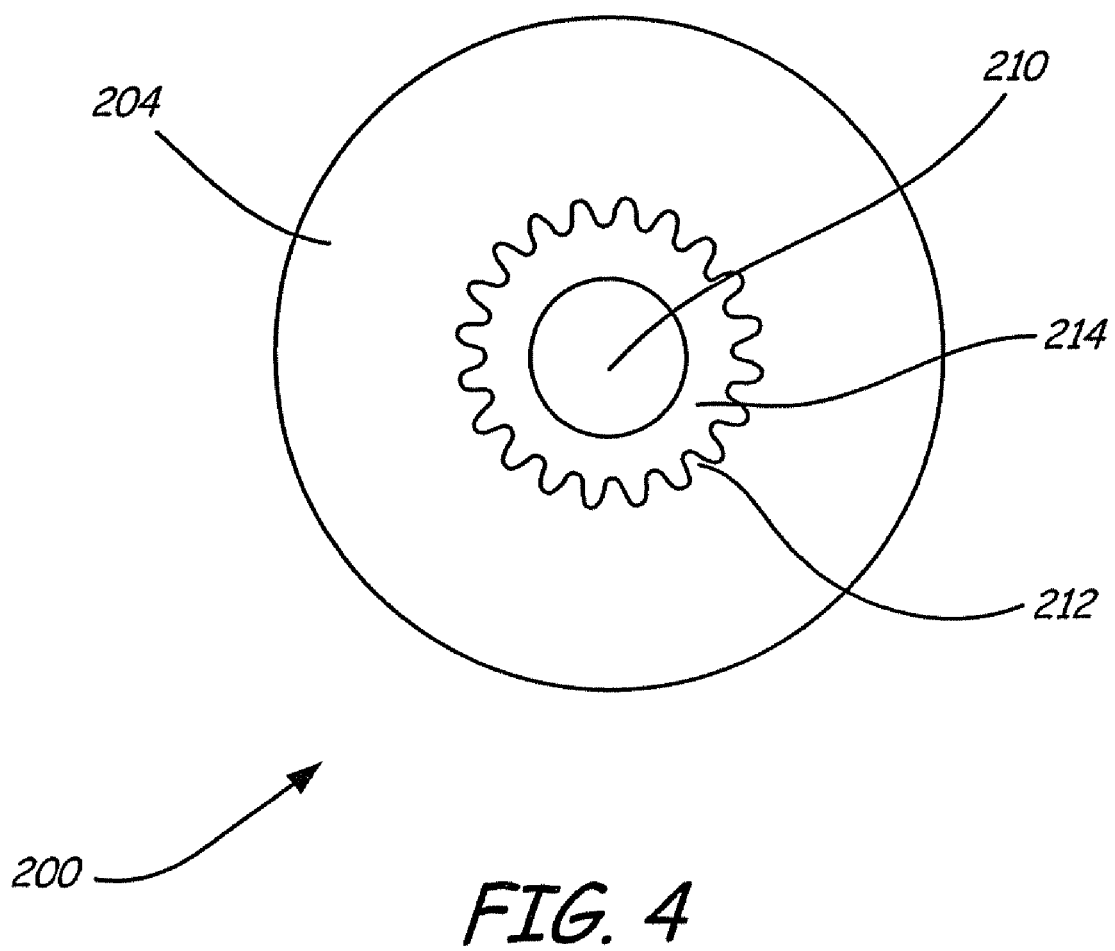
FIG. 4 is a bottom view of a hobby servo shaft attachment mechanism.

FIG. 4 is a bottom view of an embodiment of HSAM 200. HSAM 200 includes bottom surface 204, AMO 210, spline receiving surface 212, and top receiving surface 214. In an embodiment, spline receiving surface 212 includes a plurality of surfaces (e.g., teeth) that are configured to engage the teeth (or ridges) of the rotable splined output shaft 12. Other embodiments include top receiving surface 214 flushly engaging rotable splined shaft output top 13 and bottom surface 204 flushly engaging circular planar surface 15. Embodiments of spline receiving surface 212, bottom surface 204, and top receiving surface 214 include any number of surfaces and any surface shapes that engage or flushly engage any embodiments of rotable splined output shaft 12 and/or circular planar surface 15.

Figure 5:
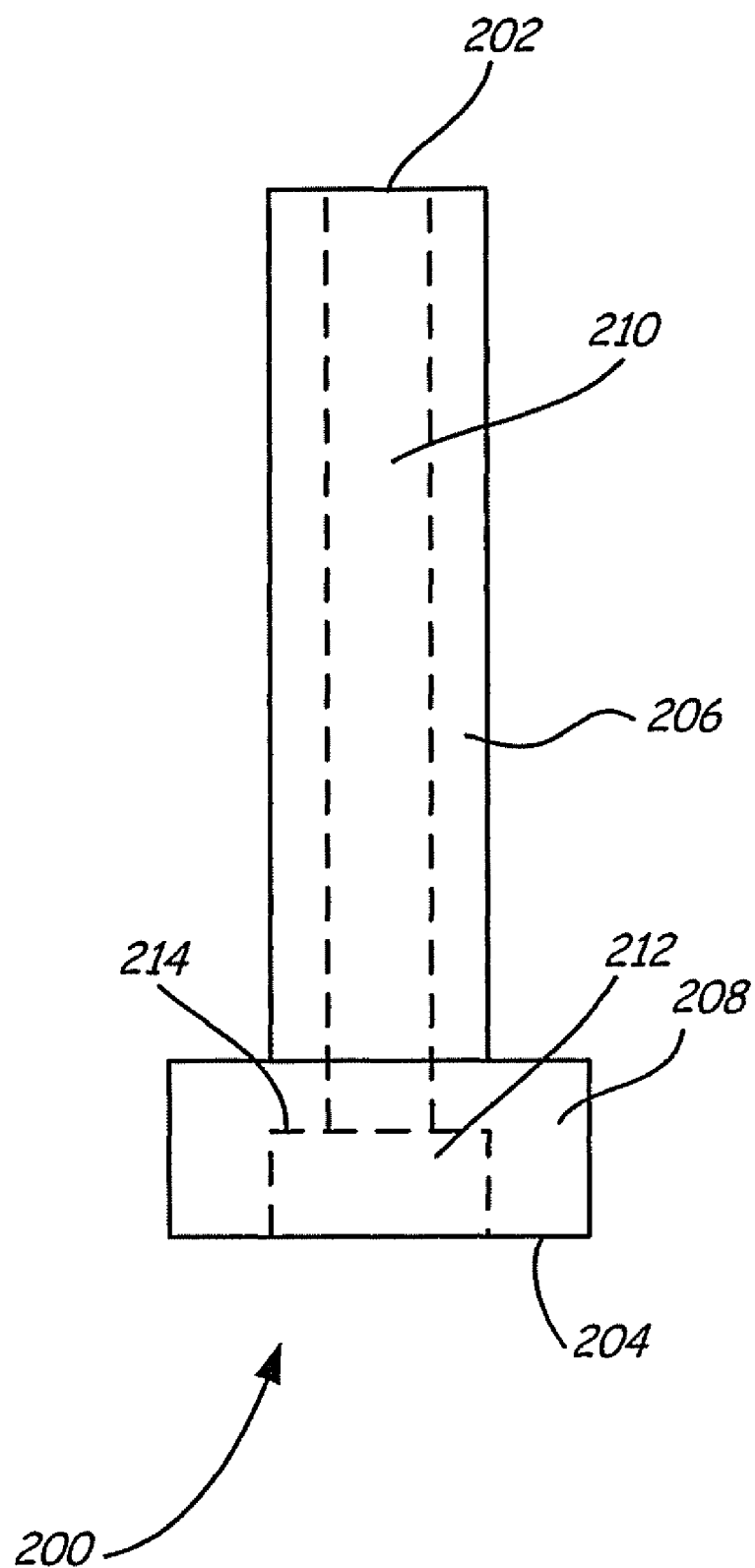
FIG. 5 is a side view of a hobby servo shaft attachment mechanism that highlights internal features.

FIG. 5 is a side view of an embodiment of HSAM 200 that highlights internal features with dotted lines. HSAM 200 includes top surface 202, attachment mechanism orifice 210, attachment surface 206, output shaft attachment housing 208, top receiving surface 214, spline receiving surface 212, and bottom surface 204. Embodiments of HSAM 200 include any desired dimensions. Embodiments of HSAM 200 are made from every material. Examples of materials include rigid materials such as 6061 T6 aluminum.

Figure 6:
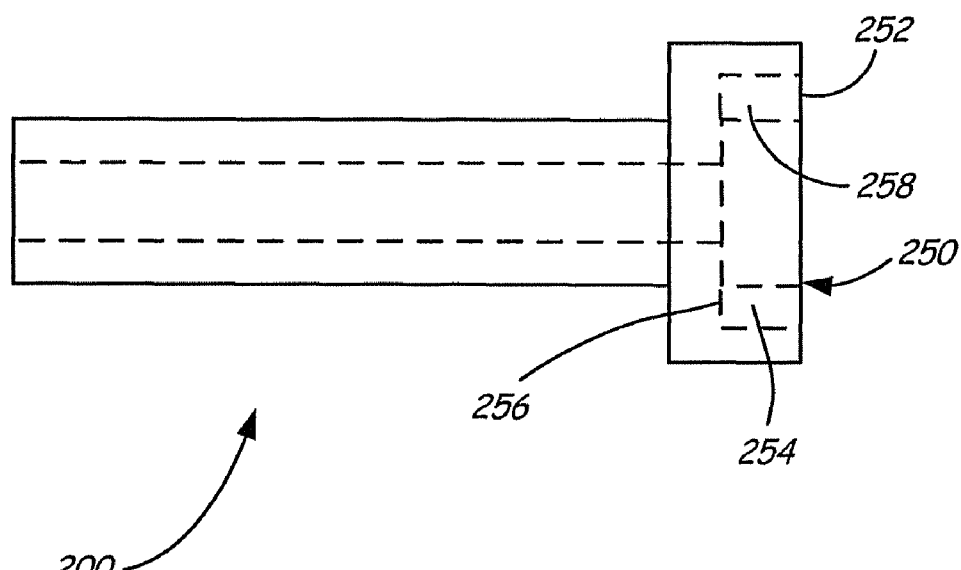
FIG. 6 is a side view of a hobby servo shaft attachment mechanism that highlights internal features.
Figure 7:
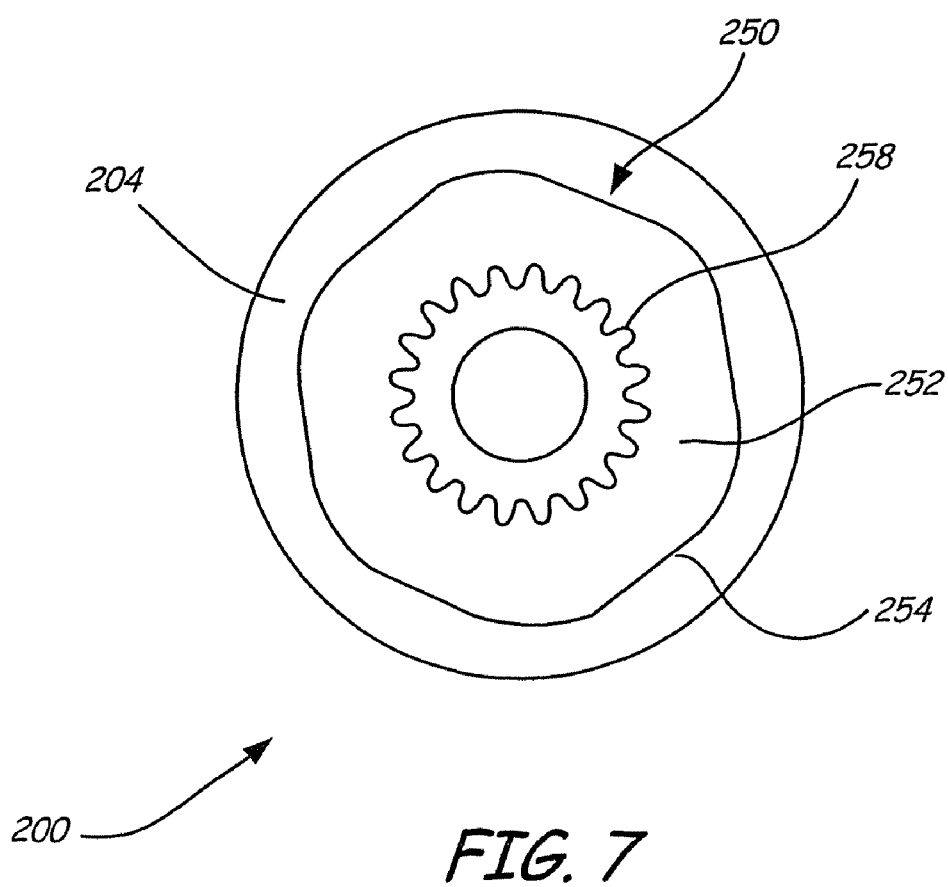
FIG. 7 is a bottom view of a hobby servo shaft attachment mechanism.

FIG. 6 is a side view of an embodiment of HSAM 200 that includes an inner output shaft housing 250 (hereinafter "IOSH 250"), and FIG. 7 is a bottom view of an embodiment of HSAM 200 that includes IOSH 250. IOSH 250 include a bottom surface 252, an outer circumferential surface 254, a top surface 256, and a spline receiving surface 258. In an embodiment, spline receiving surface 258 includes a plurality of surfaces that securely engage the teeth (or ridges) of the rotable splined output shaft 12. Embodiments of spline receiving surface 258 include any number of surfaces and any surface shapes.

Embodiments of outer circumferential surface 254 include any number of sides such as six. In some embodiments the sides come together at sharp angles. In other embodiments the sides come together at rounded corners. In yet other embodiments, outer surface 254 is cylindrical and includes no sides.

Embodiments of IOSH 250 have dimensions and are shaped such that they fit flushly within embodiments of output shaft attachment housing 208 including top receiving surface 214. Embodiments of IOSH 250 are made of every material. Some embodiments are made of plastic, rubber, and metal. In one embodiment, the IOSH 250 material is chosen based at least partially upon the type of material or shape of output shaft 12. In another embodiment, IOSH 250 is laser cut from plastic and press-fit into output shaft attachment housing 208. In yet another embodiment, IOSH 250 and housing 208 are engaged such that rotation from output shaft 12 is transferred from IOSH 250 to attachment surface 206.

Figure 8:
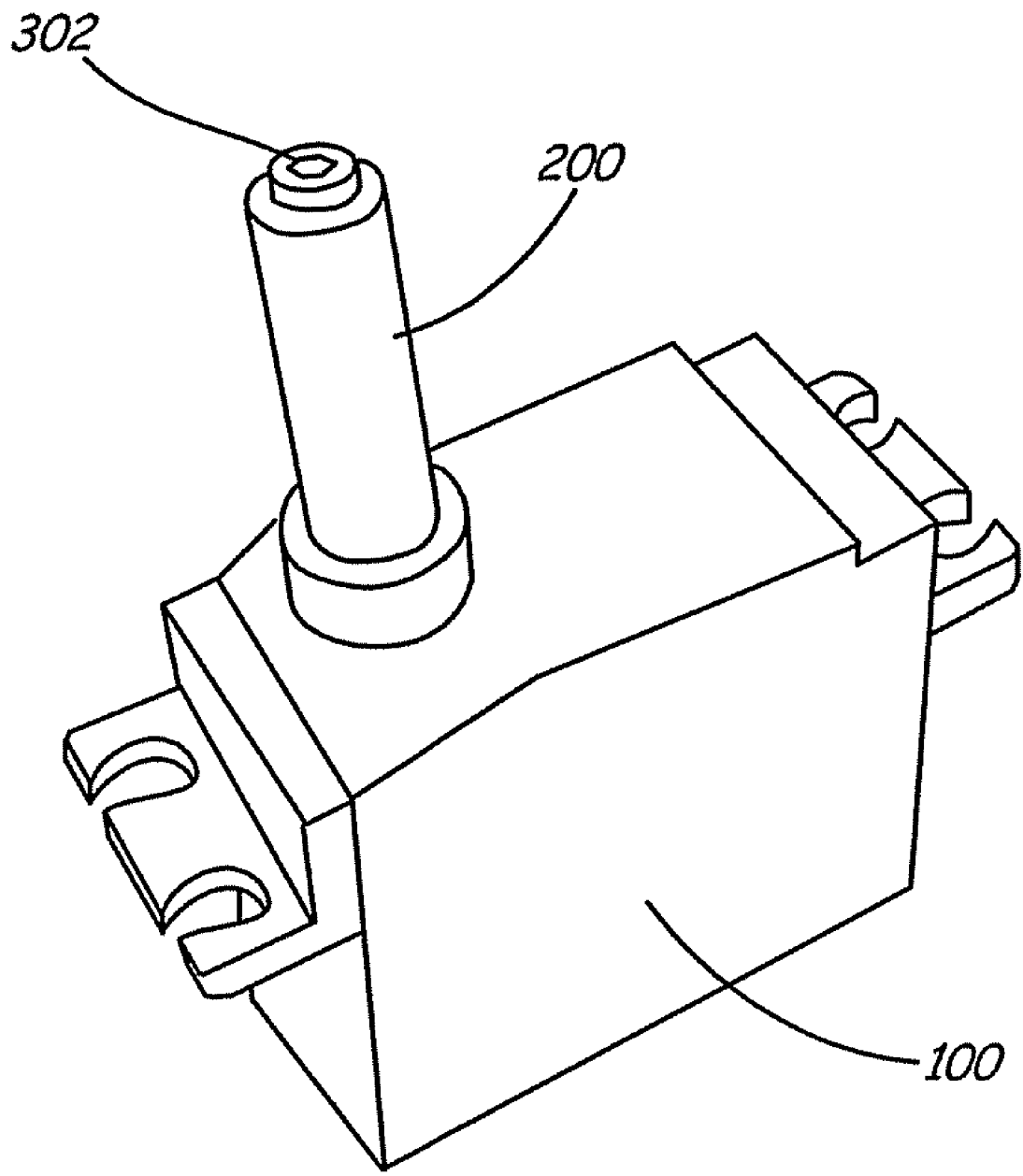
FIG. 8 is a perspective view of a hobby servo shaft attachment mechanism attached to a hobby servo.

FIG. 8 is a perspective view of an embodiment of HSAM 200 attached to an exemplary hobby servo 100. In an embodiment, HSAM 200 is securely and functionally engaged to output shaft 12 (shown in FIG. 1), and HSAM 200 bottom surfaces 204 and/or 252 are flushly engaged with circular planar surface 15 (also shown in FIG. 1). In an embodiment, HSAM 200 is securely attached to hobby servo 100 using screw 302. In other embodiments, attachment mechanisms other than screws are used. The attachment of HSAM 200 to hobby servo 100 provides many useful features. HSAM 200 provides enhanced performance such as increased strength and durability. HSAM 200 supports greater side-loads on the servo than the servo could support alone. HSAM 200 also allows for items that cannot be directly attached to a hobby servo to be indirectly attached.

Figure 9:
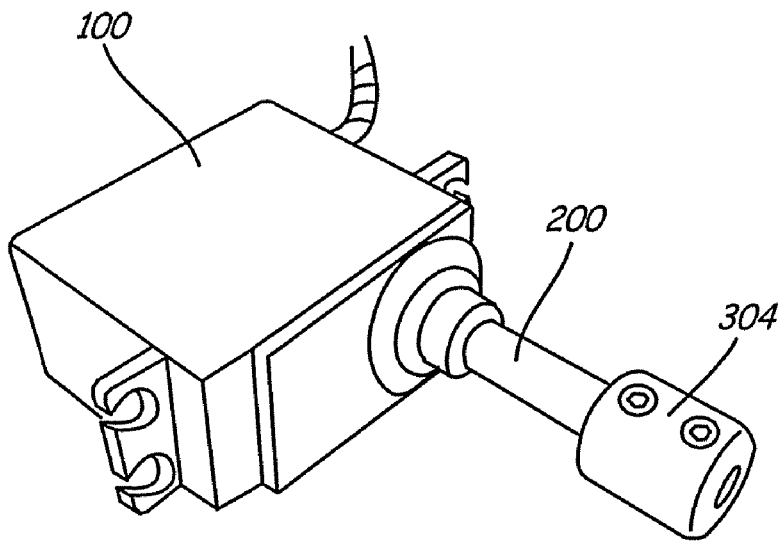
FIG. 9 is a perspective view of a coupler attached to a hobby servo shaft attachment mechanism.

FIG. 9 is a perspective view of an embodiment of a coupler 304 attached to HSAM 200. Coupler 304 connects to items such as, but not limited to, axles and gears, and rotates the items utilizing the output from hobby servo 100. Coupler 304 and HSAM 200 allow items to be connected that otherwise could not be connected to hobby servo 100. They also provide a more durable connection. For example, HSAM 200 reduces the chances that splined output shaft 12 (not shown) will be stripped during operation.

Figure 10:
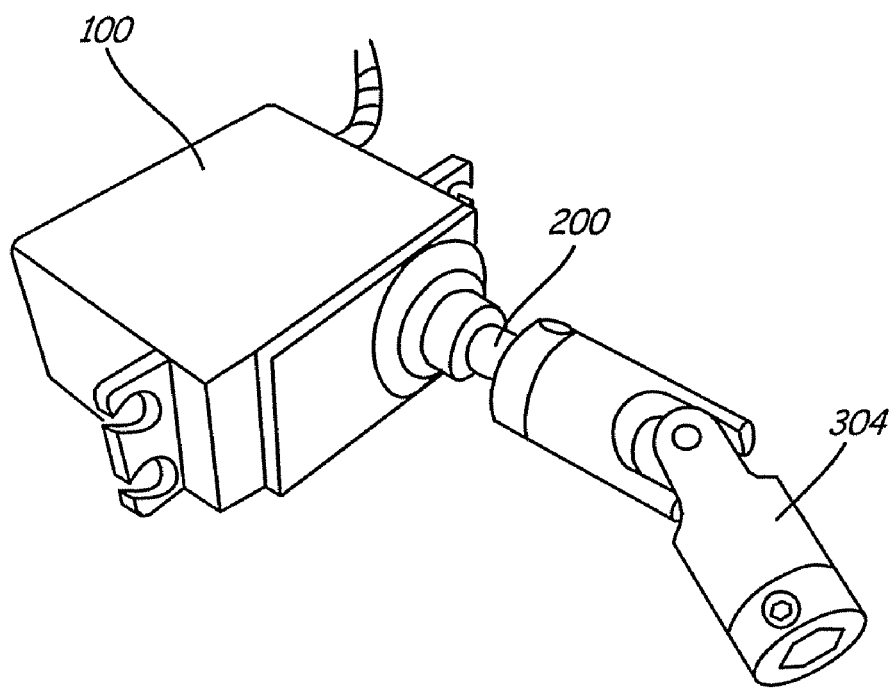
FIG. 10 is a perspective view of a universal joint attached to a hobby servo shaft attachment mechanism.

FIG. 10 is a perspective view of an embodiment of a universal joint 306 attached to HSAM 200. HSAM 200 enables universal joint 306 to be powered by hobby servo 100. HSAM 200 also enables greater performance than if universal joint 306 was attached directly to hobby servo 100.

FIGS. 9 and 10 are only examples of the many items that HSAM 200 allows to be indirectly connected to hobby servo 100. Other items include gears, sprockets, and robot arms. These items and others, achieve improved performance such as increased strength, durability, and reduced slippage.

Although the hobby servo shaft attachment mechanism has been described with reference to particular embodiments, workers skilled in the art will recognize that changes may be made in form and detail without departing from the spirit and scope of the invention.

What is claimed is:

1. An apparatus for providing enhanced hobby servo motor operational capacity, the apparatus comprising:

a hobby servo motor having a rotatable output shaft, wherein the rotatable output shaft is splined in that it includes a plurality of circumferentially distributed splines;

a shaft attachment mechanism having a spline receiving portion, the spline receiving portion including a plurality of circumferentially distributed protrusions sized and dispersed so as to support a functional engagement of the shaft attachment mechanism to the rotatable output shaft, the functional engagement being such that rotation of the rotable output shaft causes a corresponding rotation of the shaft attachment mechanism;

wherein the shaft attachment mechanism further comprises an elongated shaft that is positioned inline with the rotatable output shaft when the shaft attachment mechanism is functionally engaged to the rotatable output shaft;

wherein the rotatable output shafts include a top surface that is positioned within a plane that is substantially perpendicular relative to the plurality of circumferentially distributed splines;

wherein the shaft attachment mechanism includes a top receiving surface that, when the shaft attachment mechanism is functionally engaged to the rotatable output shaft, is positioned proximite to the top surface of the rotatable output shaft within a plane that is substantially perpendicular relative to the plurality of circumferentially distributed splines; and wherein the top receiving surface flushly engages the top surface of the rotatable output shaft when the shaft attachment mechanism is functionally engaged to the rotatable output shaft.

2. The apparatus of claim 1, wherein when the shaft attachment mechanism is functionally engaged to the rotatable output shaft, the hobby servo controls an angular position of the elongated shaft by rotating the rotatable output shaft based on a hobby servo coded input signal.

3. The apparatus of claim 1, wherein the splined rotatable output shaft includes a certain number of teeth, wherein the certain number of teeth is selected from a group consisting of 23, 24, and 25.

4. The apparatus of claim 1, wherein the rotatable output shaft includes a threaded orifice, and wherein the apparatus further comprises an elongated attachment mechanism that extends through the elongated shaft and into the threaded orifice such that the attachment mechanism becomes secured to the rotatable output shaft.

5. The apparatus of claim 1, wherein the rotatable output shaft of the hobby servo motor has a limited range of rotational motion.

6. The apparatus of claim 1, wherein positioned inline means that the elongated output shaft and the rotatable output shaft are configured to rotate about a common axis.

7. The apparatus of claim 1, wherein the shaft attachment mechanism further comprises a bottom surface configured to flushly engage a portion of a housing associated with the hobby servo motor when the shaft attachment mechanism is functionally engaged to the rotatable output shaft.

8. The apparatus of claim 1, wherein the shaft attachment mechanism is a unitarily formed, single piece.

9. The apparatus of claim 1, wherein the shaft attachment mechanism is a unitarily formed piece of metal material.

10. An apparatus for providing enhanced hobby servo motor operational capacity, the apparatus comprising:
    a hobby servo motor having a rotatable output shaft,
    a shaft attachment mechanism configured to functionally engage the rotatable output shaft such that rotation of the rotable output shaft causes a corresponding rotation of the shaft attachment mechanism, the shaft attachment mechanism including an elongated shaft that, when the shaft attachment mechanism is functionally engaged to the rotatable output shaft, is positioned along a common axis relative to the rotatable output shaft;
    wherein the shaft attachment mechanism further comprises a bottom surface configured to flushly engage a portion of a housing associated with the hobby servo motor when the shaft attachment mechanism is functionally engaged to the rotatable output shaft;
    wherein the rotatable output shaft includes a top surface that is positioned within a plane that is substantially perpendicular relative to the common axis;
    the shaft attachment mechanism includes a top receiving surface that, when the shaft attachment mechanism is functionally engaged to the rotatable output shaft, is positioned proximate to the top surface of the rotatable output shaft within a plane that is substantially perpendicular relative to the common axis; and
    wherein the top receiving surface flushly engages the top surface of the rotatable output shaft when the shaft attachment mechanism is functionally engaged to the rotatable output shaft.

11. The apparatus of claim 10, wherein when the shaft attachment mechanism is functionally engaged to the rotatable output shaft, the hobby servo controls an angular position of the elongated shaft by rotating the rotatable output shaft based on a hobby servo coded input signal.

12. The apparatus of claim 10, wherein the rotatable output shaft includes a certain number of teeth that support said functional engagement, wherein the certain number of teeth is selected from a group consisting of 23, 24, and 25.

13. The apparatus of claim 10, wherein the rotatable output shaft includes a threaded orifice, and wherein the apparatus further comprises an elongated attachment mechanism that extends through the elongated shaft and into the threaded orifice such that the attachment mechanism becomes secured to the rotatable output shaft.

14. The apparatus of claim 10, wherein the rotatable output shaft of the hobby servo motor has a limited range of rotational motion.

15. The apparatus of claim 10, wherein positioned inline means that the elongated output shaft and the rotatable output shaft are configured to rotate about a common axis.

16. The apparatus of claim 10, wherein the shaft attachment mechanism is a unitarily formed, single piece.

\* \* \* \* \*